United States Patent
Chen et al.

(10) Patent No.: US 10,944,106 B2
(45) Date of Patent: Mar. 9, 2021

(54) METAL OXIDE AND SYNTHESIS OF LITHIUM ION BATTERY

(71) Applicant: NINGDE AMPEREX TECHNOLOGY LIMITED, Ningde (CN)

(72) Inventors: Pengwei Chen, Ningde (CN); Meng Wang, Ningde (CN); Leimin Xu, Ningde (CN); Liang Wang, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 0 days.

(21) Appl. No.: 16/176,702

(22) Filed: Oct. 31, 2018

(65) Prior Publication Data
US 2019/0393501 A1    Dec. 26, 2019

(30) Foreign Application Priority Data

Jun. 25, 2018  (CN) .......................... 201810660986.3

(51) Int. Cl.
- *H01M 4/525* (2010.01)
- *H01M 10/0525* (2010.01)
- *H01M 4/02* (2006.01)

(52) U.S. Cl.
CPC ....... *H01M 4/525* (2013.01); *H01M 10/0525* (2013.01); *H01M 2004/028* (2013.01)

(58) Field of Classification Search
CPC .............. C01P 2002/72; C01P 2004/51; C01P 2002/52; C01P 2004/61; C01P 2004/03;
(Continued)

(56) References Cited

U.S. PATENT DOCUMENTS

| | | | |
|---|---|---|---|
| 6,203,947 B1* | 3/2001 | Peled | H01M 4/623 429/231.95 |
| 6,783,890 B2* | 8/2004 | Kweon | C01G 53/42 429/218.1 |

(Continued)

FOREIGN PATENT DOCUMENTS

| CN | 101281964 A | 10/2008 |
|---|---|---|
| CN | 102456879 A | 5/2012 |

(Continued)

OTHER PUBLICATIONS

Alberto Gasparotto et al., F-Doped Co3O4 Photocatalysts for Sustainable H2 Generation from Water/Ethanol, Journal of the American Chemical Society, 2011, 133, pp. 19362-19365.

(Continued)

*Primary Examiner* — Golam Mowla
(74) *Attorney, Agent, or Firm* — Juan Carlos A. Marquez; Marquez IP Law Office, PLLC (57) ABSTRACT

The present application relates to a metal oxide and synthesis of a lithium ion battery. Specifically, the present application selects a cobalt oxide compound, which uses $Co_3O_4$ as a main body, as a precursor of lithium cobalt oxide, and anion doping is performed in particles of $Co_3O_4$ to obtain a doped precursor for lithium cobalt oxide. The general formula of the precursor can be expressed as $Co_3(O_{1-y}M_y)_4$, where about $0<y<$about 0.2, and wherein the anion M comprises at least one of F, P, S, Cl, N, As, Se, Br, Te, I or At. The lithium ion battery with a cathode made of lithium cobalt oxide material prepared by using the precursor presents good cycle stability in a high voltage charge-discharge environment.

4 Claims, 2 Drawing Sheets (58) Field of Classification Search
CPC ......... C01P 2002/50; H01M 2004/028; H01M 10/0525; H01M 4/525; C01G 51/42; C01G 51/00
See application file for complete search history.

(56) References Cited

U.S. PATENT DOCUMENTS

2015/0079471 A1* 3/2015 Fang .................... H01M 4/505
429/219
2017/0062807 A1 3/2017 Vanhatalo et al.

FOREIGN PATENT DOCUMENTS

| CN | 102456879 B | 5/2012 |
|---|---|---|
| CN | 104681810 A | 6/2015 |
| CN | 104919631 A | 9/2015 |
| CN | 105977475 a | 9/2016 |
| CN | 107074588 A | 8/2017 |
| EP | 1981103 A1 | 10/2008 |
| EP | 2352190 A2 | 8/2011 |
| EP | 3570352 A1 * | 11/2019 ............. C01G 51/66 |
| WO | 2009065179 A1 | 5/2009 |

OTHER PUBLICATIONS

Minghao Yu et al., Nitrogen-Doped Co3O4 Mesoporous Nanowire Arrays as an Additive-Free Air-Cathode for Flexible Solid-State Zinc-Air Batteries, Advanced Materials, 2017, 29, 1602868 (7 pages).
Zhichao Wang, et al., Phosphorus-Doped Co3O4 Nanowire Array: A Highly Efficient Bifunctional Electrocatalyst for Overal Water Splitting, ACS Catalysis, 2018, 8, pp. 2236-2241.
The Extended European Search Report in the counterpart EU Application No. 19178731.6, dated Nov. 15, 2019.
Chinese First Office Action, dated Mar. 4, 2020, in counterpart Chinese application, 201810660986.3, 8 pages in Chinese.

* cited by examiner

METAL OXIDE AND SYNTHESIS OF LITHIUM ION BATTERY

CROSS REFERENCE TO RELATED APPLICATIONS

The present application claims the benefit of priority from the China Patent Application No. 201810660986.3, filed on 25 Jun. 2018, the disclosure of which is hereby incorporated by reference in its entirety.

BACKGROUND

1. Technical Field

The present application relates to a metal oxide and a method for preparing the same, and particularly the metal oxide can be used as a precursor for synthesizing lithium cobalt oxide as a cathode material.

The present application further relates to a lithium ion battery prepared by using the above-described lithium cobalt oxide as the cathode material.

2. Description of the Related Art

With the growing demand for energy and the challenges to the environment, we need to make more use of renewable energy. At present, among the devices that can convert the renewable energy into electric energy, the battery is more suitable for the current requirement of energy storage due to its high energy density and moderate power density. Compared with lead-acid batteries, nickel-cadmium batteries, nickel-hydrogen batteries and the like, the lithium ion battery has the advantages of high energy storage density, large power density, good safety, environmental friendliness, long service life, low self-discharge rate, wide temperature adaptation range and the like. At present, the applications of large and medium-sized power tools, energy-storage power stations, electric vehicles and intelligent power grids have put forward higher requirements on the safety, energy density, power density, cycle life, price and environmental friendliness of lithium ion batteries.

In recent years, extensive research has been carried out on the cathode, anode, separator and electrolyte of the lithium ion battery, and the cathode material is one of the key factors of the lithium ion battery. A wide variety of lithium intercalation compounds can be used as cathode materials for lithium ion batteries since the development of lithium ion batteries from the 1970s. Among the numerous cathode materials of the lithium ion batteries, lithium cobalt oxide becomes the mainstream material in the field of 3C electronic products due to higher discharge voltage platforms and higher volumetric energy density.

SUMMARY

Although lithium cobalt oxide is becoming an important cathode material of the current lithium ion battery by virtue of its own advantages, the irreversible phase change and the structure collapse will occur at high voltage charge and discharge, which leads to the destruction of the layered structure of the lithium cobalt oxide; and the contact reaction occurred between the lithium cobalt oxide and the electrolyte will lead to the destruction of the surface of the particles and the phenomenon of gas production, thereby influencing the safety performance of the battery and destroying the service life of the battery. In other words, when the lithium cobalt oxide material works under high voltage conditions, the poor thermal stability and the poor electrochemical stability of the lithium cobalt oxide material would obviously reduce the electrochemical performance and the safety performance of the battery, and thus would not meet the use demands of people for the lithium ion battery.

In the conventional art at present, elements are typically doped into lithium cobalt oxide to achieve the stability of the structure at high voltage. The conventional doping method comprises the following steps: mixing a cobalt source, a lithium source and a dopant, and sintering at high temperature to obtain a doped lithium cobalt oxide material. However, the above doping method can only realize enrichment of the doping elements in the cobalt oxide surface layer, while the doping elements are difficult to diffuse into the bulk phase of the cobalt oxide so as to realize bulk phase doping. Doping of the material will directly influence the structural stability of the cathode material and further influence the electrochemical performance of the material. The bulk phase doping of the material is difficult to be realized by adopting a traditional process method. Therefore, it is necessary to obtain a method which is simple and easy to implement and suitable for industrial production to realize the bulk phase distribution of the doping elements.

In order to solve the above-described technical problems, the present application provides a metal oxide to serve as a precursor for synthesizing a lithium cobalt oxide cathode material so as to obtain and synthesize a lithium cobalt oxide cathode material which is high voltage withstanding and has high energy density. Meanwhile, the present application further provides a method for preparing the precursor, which has the advantages of low cost, simple processing, easy control of reaction conditions and suitability for industrial production.

Additionally, the present application further provides a lithium cobalt oxide cathode material prepared from the above precursor and a lithium ion battery (such as a lithium ion secondary battery) prepared by the lithium cobalt oxide cathode material.

Specifically, according to one aspect of the present application, the present application provides a metal oxide, the general formula of the metal oxide being $Co_3(O_{1-y}M_y)_4$, wherein the anion M comprises at least one of N, F, P, S, Cl, As, Se, Br, Te, I or At, and about $0<y<$about $0.2$.

In some embodiments, in the synthesized metal oxide $Co_3(O_{1-y}M_y)_4$, a range of y is about $0.001 \leq y \leq$ about $0.05$.

In some embodiments, in the synthesized metal oxide $Co_3(O_{1-y}M_y)_4$, a range of y is about $0.005 \leq y \leq$ about $0.03$.

In some embodiments, in the synthesized metal oxide $Co_3(O_{1-y}M_y)_4$, the anion M comprises at least one of N, F, P, S or Cl.

In some embodiments, the anion M is doped in the bulk phase of the metal oxide.

In some embodiments, the median diameter $D_{50}$ of the metal oxide $Co_3(O_{1-y}M_y)_4$ is in a range of about 5-30 μm.

In some embodiments, the metal oxide $Co_3(O_{1-y}M_y)_4$ can be used as a precursor of lithium cobalt oxide as a cathode material for preparing a lithium ion battery.

According to another aspect of the present application, the present application further prepares a lithium cobalt oxide composite by using the metal oxide, the general formula of the lithium cobalt oxide composite being $LiCo(O_{1-y}M_y)_2$, wherein the anion M comprises at least one of N, F, P, S, Cl, As, Se, Br, Te, I or At, and about $0<y<$about $0.2$.

In some embodiments, a C-axis expansion rate in crystal cell parameters of the lithium cobalt oxide composite is about 2-6%.

In some embodiments, the median diameter $D_{50}$ of the lithium cobalt oxide composite is in a range of about 10-35 µm.

In some embodiments, in the lithium cobalt oxide composite, a range of y is about 0.001≤y≤about 0.05.

In some embodiments, in the lithium cobalt oxide composite, a range of y is about 0.005≤y≤about 0.03.

According to another aspect of the present application, the present application provides a lithium ion battery, comprising a cathode, an anode, a separator and electrolyte, wherein the cathode comprises the lithium cobalt oxide composite prepared by the metal oxide $Co_3(O_{1-y}M_y)_4$.

According to another aspect of the present application, the present application provides a method for preparing the metal oxide, comprising the following steps of: mixing and reacting a solution of a compound containing anion M, a solution of a compound containing Co and an alkali solution to obtain a precipitate material; and sintering the precipitate material at about 300° C.-1100° C. to obtain the metal oxide, the general formula of the metal oxide being $Co_3(O_{1-y}M_y)_4$, wherein the anion M comprises at least one of F, P, S, Cl, N, As, Se, Br, Te, I or At, and about 0<y<about 0.2.

In some embodiments, the compound containing the anion M comprises at least one of lithium salt, cobalt salt, acid salt or alkaline salt of the anion M.

In some embodiments, the compound containing Co comprises at least one of cobalt chloride, cobalt acetate, cobalt sulfate, cobalt nitrate, cobalt carbonate, cobalt oxalate, cobalt citrate or cobalt phosphate.

In some embodiments, the alkali solution comprises at least one of ammonia carbonate, ammonium hydrogen carbonate, ammonia, sodium hydroxide, sodium carbonate or sodium hydrogen carbonate.

In some embodiments, in the step of mixing and reacting, a complexing agent is added and the pH value of the solution is adjusted to about 3.5-10.

In some embodiments, the complexing agent is ethylene diamine tetra-acetic acid.

In some embodiments, the precipitate material is sintered in an air atmosphere or an inert atmosphere.

In some embodiments, the sintering duration is about 6-12 h.

In some embodiments, a range of y is about 0.001≤y≤about 0.05.

In some embodiments, a range of y is about 0.005≤y≤about 0.03.

The additional aspects and advantages of the embodiments of the present application will be described and illustrated partially in the subsequent description or stated through implementation of the embodiments of the present application.

BRIEF DESCRIPTION OF THE DRAWINGS

The drawings illustrate an implementation solution of the present application and are used together with the above-mentioned description for further understanding the technical purpose of the present application. However, the scope claimed by the present application shall not be limited to the drawings.

DETAILED DESCRIPTION OF PREFERRED EMBODIMENTS

The present application will be described below in detail. It shall be understood that terms used in the specification and the annexed claims shall not be explained as limited to meanings in a common sense and dictionaries but be explained based on meanings and concepts corresponding to the technical aspects of the present application on the basis of the principle that the inventor is allowed to properly define the terms to make an optimum explanation. Therefore, the implementation solution in the specification and the description in the drawings are only specific examples used for the purpose of description rather than intentions to illustrate all technical aspects of the present application, and it shall be understood that, when the present application is filed, various alternative equivalents and variants may be completed thereto.

I. Testing Method 1.1 SEM Testing

Scanning Electron Microscope (SEM) is used for obtaining a morphological structure of a sample through mutual effect of an electron beam and the sample and by using secondary electron signal for imaging. An SEM used in this testing method was JSM-6360LV SEM of JEOL Company and a matched X-ray energy spectrometer, which were used for analyzing the morphological structure and element distribution of the sample.

1.2 Powder XRD Testing

X-Ray Diffraction (XRD) is mainly used for carrying out research on an internal crystal structure of a material because X-ray has a wavelength close to the interplanar spacing and has certain penetrating ability. A beam of X-ray penetrates through crystals and is diffracted, and then a diffraction pattern thereof is analyzed, such that phase identification and structural analysis can be performed thereto.

XRD testing was performed on lithium cobalt oxide composite powder in the present application. Testing conditions were as follows: Cu Kα radiation, working current of about 250 mA, continuous scanning, working voltage of about 40 kV, scanning range 2θ of about 10-80°, step length of about 0.02, scanning speed of about 10°/min$^{-1}$.

1.3 Capacity Testing

Five batteries in the comparative examples and the embodiments were respectively taken, charged to voltage of about 4.45V at constant current of about 0.2 C at normal temperature and further charged to current lower than about 0.05 C at constant voltage of about 4.45V, so that they were at a fully charged state of about 4.45V. Then constant current discharge was performed at about 0.2 C until the voltage was about 3.0V to obtain the discharge capacity. The discharge capacity per gram was calculated by the following calculation formula: Discharge capacity per gram=discharge capacity/mass of cathode material.

Herein, the average discharge capacity per gram of each group of batteries is as shown in Table 1.

1.4 High Temperature Storage Testing

Five batteries in the comparative examples and the embodiments were respectively taken, charged to voltage of about 4.45V at constant current of about 0.5 C at normal temperature and further charged to current lower than about 0.05 C at constant voltage of about 4.45V, so that they were at a fully charged state of about 4.45V. The thicknesses of the fully charged batteries prior to storage were tested and recorded as $D_0$. Then, the fully charged batteries were put in an oven at about 85° C. for about twenty-four hours and then taken out, and the thickness of the batteries after storage were immediately tested and recorded as $D_1$.

The thickness expansion rate of the batteries is calculated according to the following formula:

$$\varepsilon = (D_1 - D_0)/D_0 \times 100\%.$$

The average thickness expansion rate of each group of batteries is as shown in Table 1.

1.5 Cycle Performance Testing

Five lithium ion batteries in comparative examples and embodiments were respectively taken and charged and discharged repetitively through the following steps, and the discharge capacity retention rates of the lithium ion batteries were calculated.

Firstly, in an environment of about 25° C., the batteries were first charged and discharged. The batteries were charged at a constant current of about 0.7 C (i.e., a current value at which the theoretical capacity was fully discharged within about 2 h) and were charged at a constant voltage until the upper limit voltage was about 4.45V. Then, the batteries were discharged at a constant current of about 0.5 C till the final voltage was about 3V. The discharge capacity of the first cycle was recorded. The batteries were charged and discharged for 200 cycles and the discharge capacity of the $200^{th}$ cycle was recorded.

Cyclic capacity retention rate=(discharge capacity of the $200^{th}$ cycle/discharge capacity of the $1^{st}$ cycle)×100%.

The cyclic capacity retention rate of each group of batteries is as shown in Table 1.

II. Synthesis Method

Methods for preparing a precursor for lithium cobalt oxide, a cathode material of lithium cobalt oxide, and a battery are described in this part.

2.1 Synthesis Method of the Precursor for Lithium Cobalt Oxide

Metal oxide $Co_3(O_{1-y}M_y)_4$ may be prepared through a liquid phase precipitation process and a sintering process. The liquid phase precipitation process was to mix a compound containing Co and a compound containing anion M in an aqueous solution and adjust technical parameters such as pH of the mixed solution, feeding speed, stirring speed and reaction temperature to enable different atoms to be simultaneously precipitated in a synthesis process and realize atom-level mixing. Specifically, the synthesis method comprises:

a liquid phase precipitation step: a solution of compounds containing one or more of F, P, S, Cl, N, As, Se, Br, Te, I and At, a solution of compounds containing Co and an alkali solution were mixed and reacted to obtain a precipitate material; and a sintering step: the precipitate material was sintered at about 300° C.-1100° C. to obtain a precursor $Co_3(O_{1-y}M_y)_4$ for cathode materials of a lithium ion battery, wherein about 0<y<about 0.2.

In some embodiments, the compound containing the anion M includes but is not limited to at least one of lithium salt, cobalt salt, acid salt or alkaline salt of the anion M; the compound containing Co includes but is not limited to at least one of cobalt chloride, cobalt acetate, cobalt sulfate, cobalt nitrate, cobalt carbonate, cobalt oxalate, cobalt citrate or cobalt phosphate; and the alkali solution includes but is not limited to at least one of ammonia carbonate, ammonium hydrogen carbonate, ammonia, sodium hydroxide, sodium carbonate or sodium hydrogen carbonate.

In some embodiments, a complexing agent may be further added at the liquid phase precipitation stage to promote uniform precipitation of particles. For example, the complexing agent may be ethylene diamine tetra-acetic acid, polyvinylpyrrolidone, citric acid or the like.

In some embodiments, in the sintering step, the atmosphere is an air atmosphere or inert atmosphere, and the sintering duration is about 6-12 h.

Specific preparation methods adopted in Embodiments 1-32 of the present application are specifically described below.

Embodiment 1

Urea was added as a doping source of element N in a liquid phase precipitation synthesis process of precursors, and the doping amount of N was controlled to be about 0.1% to obtain a mixture of a doped precursor. The material was taken out and placed in an inert atmosphere for sintering at the temperature of about 650° C., and then was grinded to obtain the desired doped precursor material.

Firstly, soluble cobalt salt ($CoCl_2$) was dissolved in water to obtain a solution with concentration of about 1 mol/L, and stirring was continuously performed. About 1 mol/L aqueous ammonia solution was prepared and a certain amount of urea was added to the solution (enabling the content of element N in the solution to be about 0.001 mol/L). The above two kinds of solution were added into a reaction container at a certain flow rate, with controlling the flow rate of air introduced to the solution in the reaction container in the reaction process. The pH value of the solution was adjusted to be about 8, and simultaneously about 500 ml of about 0.5 mol/L complexing agent EDTA solution was added so that the reactants could precipitate and react. After reaction for about 8 h, the product was obtained and was aged, and was subjected to multiple instances of filtration and slurry washing to obtain a mixture of an anion-doped precursor.

Embodiments 2-32 adopted the same preparation method as Embodiment 1 except for the parameters specially indicated in Embodiments 2-32.

Embodiments 2-11

Doped precursor materials were prepared according to the same method as Embodiment 1, and the doping amount of N was respectively controlled to be about 0.5%, about 1.0%, about 1.5%, about 2.0%, about 2.5%, about 3.0%, about 3.5%, about 4.0%, about 4.5% and about 5.0%.

Embodiment 12

$CoF_3$ was added as a doping source of element F in a liquid phase precipitation synthesis process of precursors, and the doping amount of F was controlled to be about 2% to obtain a mixture of a doped precursor. The material was taken out and placed in an inert atmosphere for sintering at the temperature of about 400° C., and then was grinded to obtain the desired doped precursor material.

Embodiments 13-22

Doped precursor materials were prepared according to the same method as Embodiment 12, and the sintering temperature was respectively controlled to be about 450° C., about 500° C., about 550° C., about 600° C., about 650° C., about 700° C., about 750° C., about 800° C., about 850° C. and about 900° C.

Embodiment 23

$H_3PO_4$ was added as a doping source of element P in a liquid phase precipitation synthesis process of precursors, and the doping amount of P was controlled to be about 0.1% to obtain a mixture of a doped precursor. The material was taken out and placed in an inert atmosphere for sintering at the temperature of about 650° C., and then was grinded to obtain the desired doped precursor material.

Embodiments 24-27

Doped precursor materials were prepared according to the same method as Embodiment 23, and the doping amount of P was respectively controlled to be about 0.5%, about 2.0%, about 3% and about 5.0%.

Embodiments 28-30

$H_3PO_4$, urea and $CoF_3$ were added respectively as doping sources of elements P, N and F in a liquid phase precipitation synthesis process of precursor, and the doping amount was controlled to be about 2% to obtain a mixture of doped precursors. The materials were taken out and placed in an inert atmosphere for sintering at the temperature of about 650° C., and then was grinded to obtain the desired doped precursor materials.

Embodiments 31-33

Urea was added as a doping source of element N in a liquid phase precipitation synthesis process of precursors. The doping amount was controlled to be about 2% and simultaneously the median diameter $D_{50}$ of the doped precursors was controlled to further obtain lithium cobalt oxide materials with median diameter $D_{50}$ of about 6, about 16 and about 30 µm respectively.

2.2 Comparative Examples

In order to comparatively describe the excellent electrochemical properties of the embodiment samples obtained according to the embodiments of the present application, the present application further provides comparative examples.

Comparative Example 1

$Co_3O_4$ ($D_{50}$: 16 um) was directly sintered at about 650° C. in an inert atmosphere and anion doping was not performed.

Comparative Example 2

Urea was added as a doping source of element N in a liquid phase precipitation synthesis process of precursors, and the doping amount of N was controlled to be about 2%. The precursor product was filtered and washed, and then was directly grinded without sintering to obtain the desired doped material.

Comparative Examples 3-5

In comparative examples 3-5, a conventional method was used for doping anion in a synthesis process of lithium cobalt oxide. That is, the precursor $Co_3O_4$, the material containing lithium and the compound containing anion (such as $H_3PO_4$, urea and $CoF_3$) were mixed and sintered to synthesize doped lithium cobalt oxide materials.

2.3 Preparation Method of Lithium Cobalt Oxide Cathode Material

An anion-doped lithium cobalt oxide cathode material $LiCo(O_{1-y}M_y)_2$ could be obtained by mixing and sintering the anion-doped precursor $Co_3(O_{1-y}M_y)_4$ and the material containing lithium. Herein, the material containing lithium includes but is not limited to at least one of lithium hydroxide, lithium carbonate or lithium oxide.

Relative to about 1 mol cobalt ions in precursor $Co_3(O_{1-y}M_y)_4$, the mole number of lithium ions in the material containing lithium may be about 0.95-1.2 mol or about 1.0-1.05 mol. The mole number within the numerical range may effectively improve capacity and life characteristics. Herein, the material containing lithium may be at least one of lithium carbonate, lithium hydroxide or lithium acetate.

In addition, the calcination should be performed at the temperature of about 600° C.-1000° C. or about 700° C.-950° C. The precursor $Co_3(O_{1-y}M_y)_4$ was not completely calcined when the calcination temperature was lower than about 600° C., while the properties of the precursor and the lithium compound exposed to high temperature would change when the calcination temperature was higher than about 1000° C.

More specifically, in the embodiments and comparative examples of the present application, the anion-doped precursor $Co_3(O_{1-y}M_y)_4$ and lithium hydroxide were mixed according to a molar ratio of about 1.0:1.03, and sintered for about 8 h at about 850° C. to obtain the doped lithium cobalt oxide cathode material $LiCo(O_{1-y}M_y)_2$.

2.4 Preparation of Battery

The anion-doped cathode material as the active substance, conductive agent acetylene black and binder polyvinylidene fluoride (PVDF) were fully stirred and uniformly mixed in an N-methylpyrrolidone solvent system according to a weight ratio of about 94:3:3. Then, the obtained mixture was coated on an Al foil, dried, and pressed to obtain a cathode electrode.

The artificial graphite as the active substance, conductive agent acetylene black, binder styrene butadiene rubber (SBR) and thickener sodium carboxymethyl cellulose (CMC) were fully stirred and uniformly mixed in deionized water according to a weight ratio of about 95:2:2:1. Then, the obtained mixture was coated on a Cu foil, dried, and pressed to obtain an anode electrode.

A polyethylene (PE) porous polymeric film was used as a separator.

The cathode electrode, the separator and the anode electrode were sequentially stacked to enable the separator to be located between the cathode and anode to play a role of separation. The stack was wound to obtain a bare battery core. The bare battery core was placed in an outer package with injecting the prepared basic electrolyte and was packaged.

III. Specific Embodiments

In the present application, $Co_3O_4$ was selected as the precursor of $LiCoO_2$, and a certain amount of anion was doped into the particles of $Co_3O_4$ to obtain the doped precursor for lithium cobalt oxide. Herein, the anion may be selected on the basis of the following criteria: the anion is capable of helping to improve ion conductivity among grains and helping to improve material stability. Anions which meet the above requirements include but are not limited to elements such as N, F, P, S, Cl, N, As, Se, Br, Te, I and At.

Figure 1:
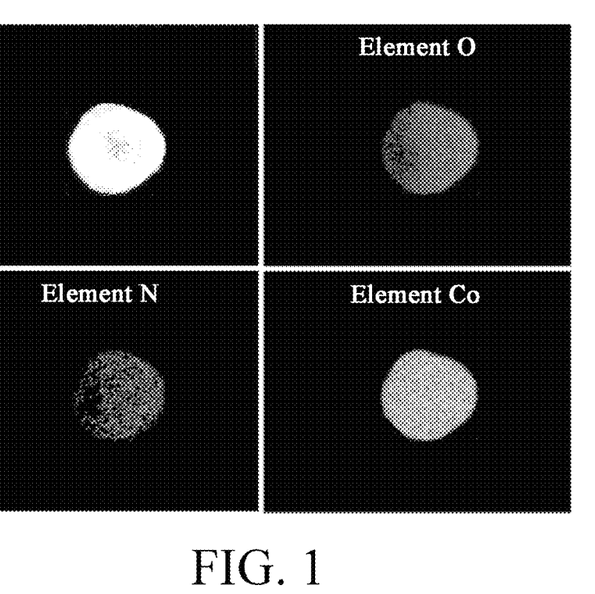
FIG. 1 illustrates an SEM micrograph of a metal oxide obtained in Embodiment 5.

FIG. 1 illustrates an SEM micrograph of a metal oxide obtained according to Embodiment 5. The left upper corner of FIG. 1 shows a distribution diagram of all elements of $Co_3(O_{1-y}M_y)_4$, the right upper corner shows a distribution diagram of element O; the left lower corner shows a distribution diagram of element N; and the right lower corner shows a distribution diagram of element Co. It can be seen from the left lower corner of FIG. 1 that the doping element N was doped in the bulk phase of $Co_3O_4$.

Figure 2:
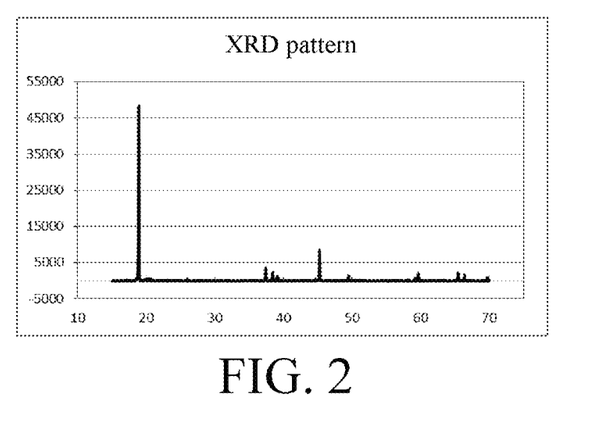
FIG. 2 illustrates an XRD pattern of lithium cobalt oxide obtained in Embodiment 5.

FIG. 2 illustrates an XRD pattern of a cathode material $LiCoO_2$ prepared according to Embodiment 5. It can be seen from the FIG. 2 that the crystal form of the doped $LiCoO_2$ was maintained well. The C-axis expansion rate was measured to be about 2.0%, which indicated that element N was doped in the bulk phase of $LiCoO_2$.

It can be obviously seen from the testing results of Comparative example 1 and Embodiments 1-11 that the performance of lithium cobalt oxide synthesized from element N-doped precursors has been greatly improved, and its thermal stability and cycling performance have been improved to varying levels.

Similarly, it can be seen from the testing results of Comparative example 1 and Embodiments 12-27 that the thermal stability and cycling performance of lithium cobalt oxide doped with elements F and P was improved compared with those of lithium cobalt oxide not doped with any elements.

The excellent electrochemical performance of doped lithium cobalt oxide cathode material is mainly attributed to: 1) in the metal oxide, a certain amount of anion M occupies the position of O, which increases the number of oxygen holes, reduces the interfacial impedance between the cathode material and electrolyte, and plays a very good relaxation effect on the decomposition of the electrolyte and corrosion of the cathode material, and as a result, the electrochemical performance of the material under high voltage is improved; 2) the anions M are distributed in the bulk phase of the precursor and the lithium cobalt oxide, which is helpful to improve the ion transport for the lithium ions among the grains and to improve the diffusion speed of lithium ions in the crystals; and 3) except being distributed in the precursor bulk phase, the anions located in the surface region of the particles form solid solutions on the surface structure of the material, which stabilizes the crystal structure of the particle surface, reduces the chance of contact between lithium cobalt oxide and electrolyte, reduces the dissolution of cobalt in the lithium cobalt oxide material fundamentally, further prevents the destruction of the layered structure, and enhances electrochemical properties of the cathode material.

In some embodiments, M may be selected from at least one of the following elements: N, F, P, S, Cl, As, Se, Br, Te, I or At. Especially, N, F, P, S or Cl obviously improve the stability of the material and the diffusion coefficient of lithium. It is noteworthy, however, that the anion M is not limited to the above-mentioned specially designated types. As long as it is an anion that can help to improve the ion conductivity among grains and to improve the stability of the material, it falls within the protective scope of the present application.

3.1 Discussion about the Influence of Content of Doping Element on Electrochemical Performance Referring to the testing results of Embodiments 1-11 and Embodiments 23-27 in Table 1, it can be seen that the stability of the material increases along with the increase of the amount of the doping amount of the anion N or P. However, when the doping amount of the anion is too high, the improvement of the stability of the material is no longer obvious, and will in fact lead to a significant decrease in the capacity per gram of the material. When the doping amount of the anion is too low, the improvement of the material performance is not obvious and it is difficult to achieve the desired effects. Therefore, the doping of a proper amount of anion can ensure optimization on the performance of lithium cobalt oxide, and does not cause the material to lose great discharge specific capacity. In some embodiments, the doping amount of the anion is about 0.1%-20.0%. In some embodiments, the doping amount of the anion is about 0.1%-5.0%. In some embodiments, the doping amount of the anion is about 0.5%-3.0%. It should be noted that the numerical values are determined based on the mole number of oxygen atoms in the metal oxide.

3.2 Discussion about the Influence on the Performance of Lithium Cobalt Oxide of Doping Anions in Precursor or Doping Anions in Lithium Cobalt Compared to Embodiments 5, 17 and 25 (in which elements were doped in the synthesis process for the precursor), the doping process in Comparative examples 3-5 occurred at the synthesis stage for lithium cobalt oxide. That is, the precursor $Co_3O_4$, the material containing lithium and the compound containing the anion (e.g., urea, phosphoric acid and $CoF_3$) were mixed and sintered.

From the data presented in Table 1, it can be concluded that the electrochemical performance of the batteries obtained in Embodiments 5, 17 and 25 is better. For example, compared with Comparative examples 3-5, the high-temperature storage thickness expansion rates of the batteries obtained in Embodiments 5, 17 and 25 were significantly reduced, and the cyclic stability was also significantly improved.

This is due to the fact that the distribution of the doped ions in the bulk phase of the material is realized by using the synthesis method in the present application, and the enrichment of the doped ions only in the surface layer of the material is avoided. That is to say, bulk phase doping effectively improves the stability of the overall structure of the cathode material, thereby improving the thermal stability and cycling performance of the cathode material.

3.3 Discussion about Influence of Sintering on Electrochemical Performance

From Embodiments 1-11 and Comparative example 2, it can be seen that the sintered material has better structural stability. This is because the sintering process is accompanied by the recrystallization of the material at high temperatures, which can effectively improve the consistency of atom arrangement within the particles and improve the structural stability of the material.

Sintering temperature is also an important factor for affecting the properties of the material. According to Embodiments 13-22, it can be seen that the higher the sintering temperature, the better the stability of the material. However, when the sintering temperature was too high, the phenomenon of over-firing occurred, which leaded to the reduction of material capacity and negatively affects the cycle performance. Nevertheless, if the temperature was too low, the improvement of the properties was not obvious because the excessive low temperature was insufficient to optimize the overall performance of the material. In some embodiments, the sintering temperature range was about 400-900° C., or about 500-800° C.

3.4 Discussion about Influence of Sintering Atmosphere on Electrochemical Performance The sintering atmosphere will also affect the properties of the coated material. In Embodiments 5, 17 and 25, sintering was performed in an inert atmosphere, while in Embodiments 28-30, sintering was performed in an air atmosphere. From the data in Table 1, it can be seen that the electrochemical properties of the material sintered at high temperature in the inert atmosphere are better than those sintered in the air atmosphere. This is mainly because the non-metallic ions may be oxidized at different degrees at high temperature during sintering in air, which destroys the particle structure and affects the stability of the material and the safety of the battery.

3.5 Discussion about Influence of the Median Diameter on Electrochemical Performance The median diameter $D_{50}$ of the obtained metal oxide should not be too large or too small, because the median diameter of the metal oxide directly affects the median diameter of the subsequently synthesized lithium cobalt oxide. For example, when $D_{50}$ is too large, the lithium ion diffusion path in the material particles is increased, which will deteriorate the ion diffusion environment and negatively affect the cycling performance. When $D_{50}$ is too small, the small particles have large specific surface area, which will increase the contact area with the electrolyte, thereby destroying the high temperature storage performance of the material.

Lithium cobalt oxides with a median diameter of about 6 μm, about 16 μm and about 30 μm were respectively synthesized in Embodiments 31-33, all of which exhibit excellent thermal stability and cycling performance.

In some embodiments, the median diameter $D_{50}$ of the metal oxide is about 5-30 μm. In some embodiments, the median diameter $D_{50}$ of $LiCo(O_{1-y}M_y)_2$ is in the range of about 10-35 μm.

Described above are embodiments listed in the present application. However, since the applicant cannot exhaust all the embodiments, all other equivalent embodiments which are obtained based on the teaching of the present application fall within the protective scope of the present application. Compared with the conventional art, the present application has at least the following beneficial technical effects: the liquid phase precipitation method with ion level mixing and the high temperature sintering method are used to synthesize the bulk phase doped cobalt oxide precursor, which avoids the situation that elements are enriched on the surface layer rather than doping into the bulk phase of the cathode material. At the same time, the lithium cobalt oxide cathode material prepared by the cobalt oxide precursor can effectively improve the structural stability of the material under a high voltage charging and discharging environment, and improve the cycling performance, high temperature performance and thermal performance of the cathode material. In addition, the preparation method in the present application is simple, easy to operate and control, and is suitable for industrial production.

To sum up, the present application provides a simple and feasible method which is suitable for industrial production to prepare the anion-doped precursor for the lithium cobalt oxide as cathode materials. The particle structure of the lithium cobalt oxide cathode material prepared by the precursors is stable, which can effectively improve the electrochemical performance and safety performance of the battery.

As used herein, the term "about" is used to describe and illustrate minor changes. When being used in conjunction with events or situations, the term may refer to examples where the event or situation occurs exactly as intended and to examples where the event or situation is very similar to that which was intended. For example, when being used in conjunction with a numerical value, the term may refer to a variation range of less than or equal to ±10%, for example, less than or equal to ±5%, less than or equal to ±4%, less or equal to ±3%, less or equal to ±2%, less or equal to ±1%, less or equal to ±0.5%, less or equal to ±0.1%, or less or equal to ±0.05% of the numerical value. In addition, sometimes amount, ratio and other values are presented in the form of ranges herein. It should be understood that such form of ranges is intended for convenience and simplicity, and should be flexibly understood to include not only values explicitly designated as range-limited, but also all individual numerical values or sub-ranges that are covered by the ranges, as well as each numerical value and sub-range as explicitly specified.

The above-mentioned description abstract summarizes the features of several embodiments, which enable those with general knowledge in the technical field to better understand the various aspects of the present application. Those with general knowledge in the technical field may easily use the present application as a basis for designing or modifying other compositions so as to achieve the same purposes and/or advantages as the embodiments applied herein. It is also understandable to those with general knowledge in the technical field that these equal examples do not depart from the spirit and scope of the present application, and that the present application may be altered, replaced and modified in various ways without departing from the spirit and scope of the present application. Although the method disclosed herein has been described with reference to specific operations performed in specific order, it should be understood that these operations may be combined, subdivided or reordered without departing from the teaching of the present application to form an equivalent method. Therefore, unless otherwise specifically indicated herein, the order and grouping of operations shall not be construed as any limitation on the present application.

TABLE 1

Experimental results of Embodiments and Comparative examples

| | Doping element | C-axis expansion rate of synthesized $LiCoO_2$ | Doping amount | Sintering temperature | Sintering atmosphere | Discharge capacity per gram (mAh/g) at about 0.2 C | High temperature storage thickness expansion rate % | Cyclic capacity retention rate % |
|---|---|---|---|---|---|---|---|---|
| Embodiment 1 | N | 1.5% | 0.1% | 650° C. | Inert | 179 | 35% | 80% |
| Embodiment 2 | N | 1.9% | 0.5% | 650° C. | Inert | 178 | 28% | 81% |

TABLE 1-continued

Experimental results of Embodiments and Comparative examples

| | Doping element | C-axis expansion rate of synthesized $LiCoO_2$ | Doping amount | Sintering temperature | Sintering atmosphere | Discharge capacity per gram (mAh/g) at about 0.2 C | High temperature storage thickness expansion rate % | Cyclic capacity retention rate % |
|---|---|---|---|---|---|---|---|---|
| Embodiment 3 | N | 2.0% | 1.0% | 650° C. | Inert | 178 | 19% | 81% |
| Embodiment 4 | N | 2.1% | 1.5% | 650° C. | Inert | 177 | 15% | 83% |
| Embodiment 5 | N | 2.3% | 2.0% | 650° C. | Inert | 177 | 13% | 86% |
| Embodiment 6 | N | 2.4% | 2.5% | 650° C. | Inert | 176 | 12% | 84% |
| Embodiment 7 | N | 2.5% | 3.0% | 650° C. | Inert | 175 | 12% | 80% |
| Embodiment 8 | N | 2.6% | 3.5% | 650° C. | Inert | 174 | 11% | 77% |
| Embodiment 9 | N | 2.8% | 4.0% | 650° C. | Inert | 173 | 11% | 75% |
| Embodiment 10 | N | 2.9% | 4.5% | 650° C. | Inert | 171 | 10% | 75% |
| Embodiment 11 | N | 3.1% | 5.0% | 650° C. | Inert | 168 | 9% | 72% |
| Embodiment 12 | F | 2.4% | 2% | 400° C. | Inert | 158 | 29% | 59% |
| Embodiment 13 | F | 2.5% | 2% | 450° C. | Inert | 159 | 27% | 62% |
| Embodiment 14 | F | 2.6% | 2% | 500° C. | Inert | 163 | 23% | 66% |
| Embodiment 15 | F | 2.6% | 2% | 550° C. | Inert | 168 | 22% | 68% |
| Embodiment 16 | F | 2.4% | 2% | 600° C. | Inert | 172 | 21% | 69% |
| Embodiment 17 | F | 2.5% | 2% | 650° C. | Inert | 176 | 17% | 77% |
| Embodiment 18 | F | 2.3% | 2% | 700° C. | Inert | 175 | 20% | 76% |
| Embodiment 19 | F | 2.5% | 2% | 750° C. | Inert | 170 | 21% | 76% |
| Embodiment 20 | F | 2.7% | 2% | 800° C. | Inert | 162 | 25% | 69% |
| Embodiment 21 | F | 2.4% | 2% | 850° C. | Inert | 159 | 30% | 67% |
| Embodiment 22 | F | 2.5% | 2% | 900° C. | Inert | 154 | 31% | 63% |
| Embodiment 23 | P | 1.8% | 0.1% | 650° C. | Inert | 154 | 30% | 57% |
| Embodiment 24 | P | 1.9% | 0.5% | 650° C. | Inert | 160 | 27% | 68% |
| Embodiment 25 | P | 2.1% | 2% | 650° C. | Inert | 172 | 19% | 78% |
| Embodiment 26 | P | 2.8% | 3% | 650° C. | Inert | 172 | 20% | 74% |
| Embodiment 27 | P | 3.2% | 5% | 650° C. | Inert | 171 | 21% | 76% |
| Embodiment 28 | P | 2% | 2% | 650° C. | Air | 158 | 27% | 69% |
| Embodiment 29 | N | 2% | 2% | 650° C. | Air | 157 | 31% | 65% |
| Embodiment 30 | F | 2% | 2% | 650° C. | Air | 155 | 30% | 63% |
| Embodiment 31 | N($D_{50}$ = 6 μm) | 2.3% | 2% | 650° C. | Inert | 176 | 25% | 69% |
| Embodiment 32 | N ($D_{50}$ = 16 μm) | 2.3% | 2% | 650° C. | Inert | 177 | 13% | 85% |
| Embodiment 33 | N ($D_{50}$ = 30 μm) | 2.3% | 2% | 650° C. | Inert | 178 | 12% | 86% |
| Comparative example 1 | \ | 0 | 0 | 600° C. | Inert | 179 | 36% | 59% |
| Comparative example 2 | N | 2% | 2% | \ | \ | 151 | 35% | 58% |
| Comparative example 3 | N | 0.2% | 2% | 650° C. | Inert | 175 | 36% | 71% |
| Comparative example 4 | F | 0.3% | 2% | 650° C. | Inert | 173 | 32% | 58% |
| Comparative example 5 | P | 0.4% | 2% | 650° C. | Inert | 170 | 31% | 54% |

What is claimed is:

1. A lithium ion battery, comprising a cathode, an anode, a separator and electrolyte, wherein the cathode comprises a lithium cobalt oxide composite prepared by a metal oxide $Co_3(O_{1-y}M_y)_4$, the general formula of the lithium cobalt oxide composite being $LiCo(O_{1-y}M_y)_2$, wherein the M comprises one of N, P, S, Cl, As, Se, Br, Te, and I, and about 0<y<about 0.2, and wherein a C-axis expansion rate in crystal cell parameters of the lithium cobalt oxide composite is 1.5%, 1.9%, or in a range of 2%-6%.

2. The lithium ion battery according to claim 1, wherein the median diameter of the lithium cobalt oxide composite is in a range of about 10-35 μm.

3. The lithium ion battery according to claim 1, wherein about 0.001≤y≤about 0.05.

4. The lithium ion battery according to claim 1, wherein about 0.005≤y≤about 0.03.

* * * * *